July 13, 1926.
J. F. CAILLOUX ET AL
1,592,337
OVERSHOT
Filed Sept. 5, 1925
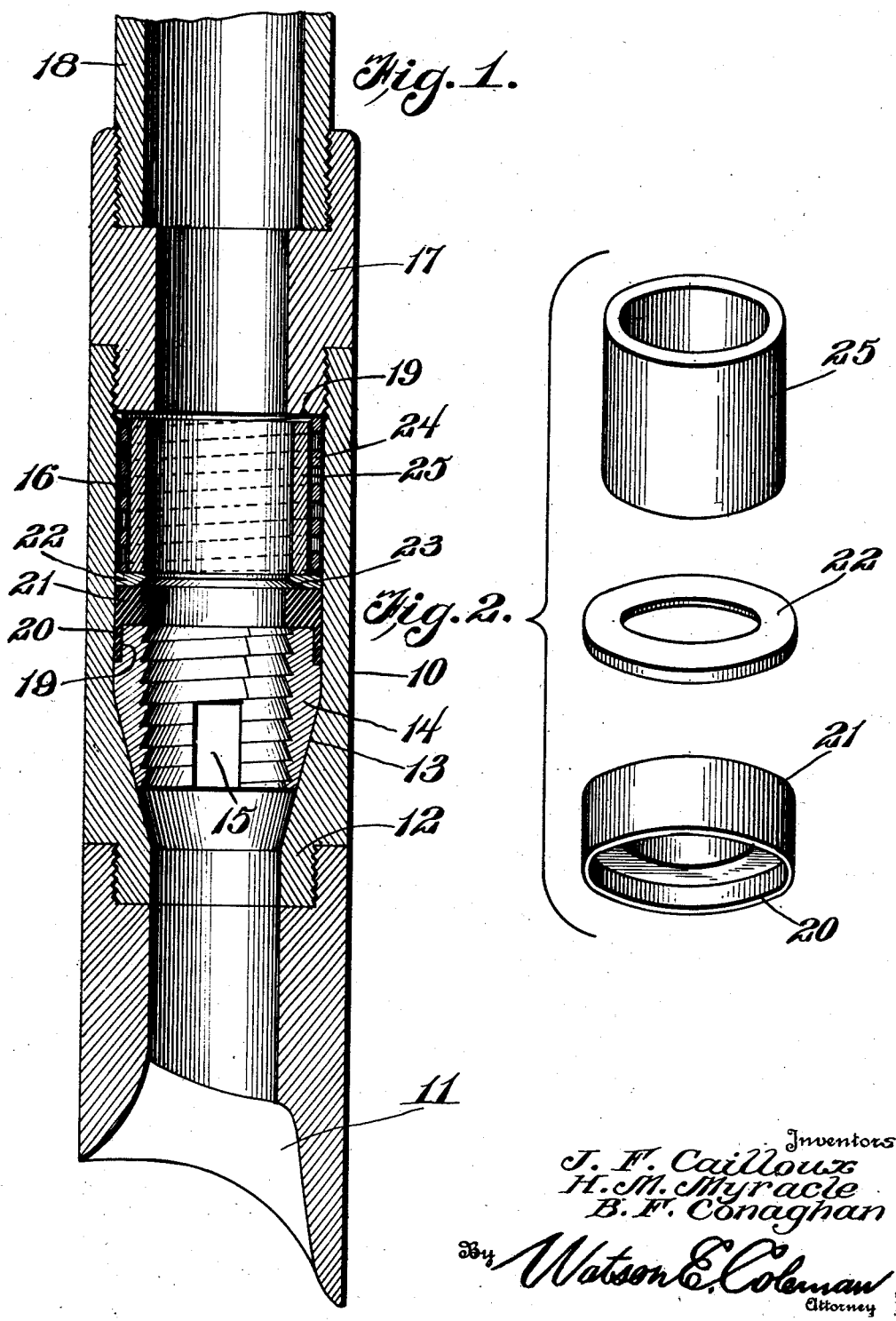
Inventors
J. F. Cailloux
H. M. Myracle
B. F. Conaghan
By Watson E. Coleman
Attorney Patented July 13, 1926.

1,592,337

UNITED STATES PATENT OFFICE.

JOHN F. CAILLOUX, HOBART M. MYRACLE, AND BILLY F. CONAGHAN, OF TONKAWA, OKLAHOMA, ASSIGNORS TO AMERICAN IRON & MACHINE WORKS, INC., OF TONKAWA, OKLAHOMA, A CORPORATION OF OKLAHOMA.

OVERSHOT.

Application filed September 5, 1925. Serial No. 54,768.

This invention relates to improvements in overshot and more particularly to an improvement in the structure of the overshot shown in Patents, Nos. 1,526,741 and 1,531,450, granted to Hobart M. Myracle, et al., under dates of February 17th, 1925, and March 31st, 1925, respectively.

An important object of the invention is to provide in a device of this character means whereby displacement of the rubber packing ring, with relation to the slips of the overshot, is prevented.

A still further object of the invention is to provide means whereby passage of a coupling upon an engaged pipe above the slips, at which point its release is impossible, is prevented and which likewise serves to hold the packing ring in position.

A further object of the invention is to provide a spring for holding the packing ring in position and a shield or sleeve for this spring, preventing contact with the spring of the jagged upper end of the pipe or the like.

A still further object is to provide a sleeve of this character which is removable, thus providing for ready cleansing of the overshot in event it becomes jammed with gravel, shale and the like.

These and other objects we attain by the construction shown in the accompanying drawings, wherein for the purpose of illustration is shown a preferred embodiment of our invention and wherein:—

Figure 1 is a vertical sectional view through an overshot constructed in accordance with our invention;

Figure 2 is a combined perspective of the sleeve, washer and packer.

Referring now more particularly to the drawings, the numeral 10 indicates the cylindrical body portion of an overshot. the lower end of which may be constructed, as at 11, to deliver an engaged pipe into the bore 12 of the overshot. This bore is enlarged above its upper end to provide a downwardly tapering conical seat section 13 against which are disposed slips 14, keyed, as at 15, against rotation with relation to the body. The upper portion of the body, containing the enlarged bore 16, engages at its upper end a coupling member 17 by means of which it may be coupled to a drill pipe 18. This coupling member provides at its lower end a downwardly facing shoulder 19 opposing the upper end of the slips 14.

The slips 14 are each rabbeted at the upper portion of their outer faces, as indicated at 19, so that between the upper portion of the slips and the wall of the bore of the body 10, a container is provided to receive a depending flange 20 formed upon the perimeter of the rubber packing washer 21. Seated upon the upper face of this rubber packing washer is a steel washer 22 preferably having an internal diameter slightly greater than the external diameter of the pipe A to be fished for and of less internal diameter than the coupling C connecting adjacent sections of this pipe. The lower inner corner of this washer is beveled, as at 23, so that the pipe will be directed through the opening of the washer in its passage.

This washer forms a seat for a relatively heavy coil spring 24 which constantly urges the washer downwardly and accordingly tends to compress the rubber packer 21 and to maintain the slips 14 in engagement with their seat. The upper end of this spring abuts against the shoulder 19 adjacent the inner face of the upper end of the bowl. Likewise seated upon the washer 22 and arranged interiorly of the spring is a sleeve 25 which is of slightly less length than the normal distance between the upper face of the washer 22 and the shoulder 19. This sleeve will accordingly permit a slight upward movement of the washer against the action of the spring but after this slight upward movement, will positively limit travel of the washer and accordingly, to a certain extent, limit the upward travel of the slips. Of course, the travel of the slips upwardly after the washer has ceased its movement will cause compression of the packer 21. In engaging the pipe during a fishing operation, the slips 14 will rise against the action of the spring 24 until the sleeve 25 comes into engagement with the shoulder 19. As the slips continue to rise, the packer or rubber washer 21 is compressed until the slips have separated sufficiently to permit passage of the pipe. In event the engaged portion of the pipe is provided with a coupling or collar C, this collar will engage against the washer 22 and will positively limit downward movement of the overshot.

At this time, both the rubber washer 21 and slips 14 will be opposed to the collar, the one to pack off and the other to grip the pipe and prevent downward movement thereof.

Attention is directed to the fact that as the slips expand, there will be a tendency on the part of the flange 20 of the packer to hold these slips in their proper position and also a tendency on the part of the sleeves to prevent displacement of the packer by the pipe during its passage therethrough. Furthermore, the normal tendency of the packer to prevent circulation will be assisted by the tension placed thereagainst by the spring 24.

Since the construction hereinbefore set forth is obviously capable of a certain range of change and modification without materially departing from the spirit of the invention, we do not limit ourselves to the specific structure hereinbefore set forth except as hereinafter claimed.

We claim:—

1. A fishing tool comprising a hollow body having a slip seat and a shoulder opposing said slip seat, slips engaging said seat, a rubber packer seated upon the upper ends of the slips and having a flange embracing the upper ends of the slips and a spring constantly urging said packer downwardly.

2. A fishing tool comprising a hollow body having a slip seat and a shoulder opposing said slip seat, slips engaging said seat, a rubber packer seated upon the upper ends of the slips and having a flange embracing the upper ends of the slips, a spring constantly urging said packer downwardly and means positively limiting upward movement of the packer and slips against the action of said spring.

3. A fishing tool comprising a hollow body having a slip seat and a shoulder opposing said slip seat, slips engaging said seat, a rubber packer seated upon the upper ends of the slips and having a flange embracing the upper ends of the slips, a spring constantly urging said packer downwardly and a sleeve loosely mounted between the packer and said shoulder and by its engagement with the shoulder positively limiting upward movement of the slip and packer.

4. A fishing tool comprising a hollow body having a slip seat and a shoulder opposing said slip seat, slips engaging said seat, a rubber packer seated upon the upper ends of the slips and having a flange embracing the upper ends of the slips, a spring constantly urging said packer downwardly and a sleeve loosely mounted between the packer and said shoulder and by its engagement with the shoulder positively limiting upward movement of the slip and packer, said sleeve being arranged inwardly of and providing a shield for said spring.

5. A fishing tool comprising a hollow body having a slip seat and a shoulder opposing said slip seat, slips engaging said seat, a rubber packer seated upon the upper ends of the slips and having a flange embracing the upper ends of the slips, a spring constantly urging said packer downwardly, and means interposed between the spring and packer positively limiting the size of the passage of the hollow body.

6. A fishing tool comprising a hollow body having a slip seat and a shoulder opposing said slip seat, slips engaging said seat, a rubber packer seated upon the upper ends of the slips and having a flange embracing the upper ends of the slips, a spring constantly urging said packer downwardly, and a washer seated upon the upper surface of said packer and against which said spring abuts, said washer having an internal diameter slightly greater than a pipe to be fished for and of less diameter than a collar for connecting adjacent sections of such pipe.

7. A fishing tool comprising a hollow body having a slip seat and a shoulder opposing said slip seat, slips engaging said seat, a rubber packer seated upon the upper ends of the slips and having a flange embracing the upper ends of the slips, a spring constantly urging said packer downwardly, a washer seated upon the upper surface of said packer and against which said spring abuts, said washer having an internal diameter slightly greater than a pipe to be fished for and of less diameter than a collar for connecting adjacent sections of such pipe and a sleeve seated upon said washer interiorly of the spring and of slightly less length than the distance between adjacent faces of the washer and the shoulder.

In witness whereof we hereunto affix our signatures.

JOHN F. CAILLOUX.
HOBART M. MYRACLE.
BILLY F. CONAGHAN.